United States Patent [19]

Smith

[11] 3,818,310
[45] June 18, 1974

[54] SWITCHING CIRCUITS FOR ENERGISING A LOAD
[75] Inventor: Stephen Clifford Smith, Stoke-on-Trent, England
[73] Assignee: International Computers Limited, London, England
[22] Filed: Apr. 13, 1973
[21] Appl. No.: 350,980

[30] Foreign Application Priority Data
Apr. 15, 1972 Great Britain.................. 17475/72

[52] U.S. Cl.................... 321/18, 318/257, 318/293, 318/344, 321/47, 323/25
[51] Int. Cl. ............................................ H02p 7/06
[58] Field of Search .......... 318/256, 257, 291, 293, 318/345, 344; 321/16, 18, 47; 323/19, 23, 24, 25

[56] References Cited
UNITED STATES PATENTS

| | | | |
|---|---|---|---|
| 2,236,984 | 4/1941 | Alexanderson | 323/25 X |
| 2,778,982 | 1/1957 | Loeffler | 318/257 |
| 3,071,653 | 1/1963 | Layburn | 321/47 X |
| 3,172,029 | 3/1965 | Davis | 321/47 |
| 3,181,046 | 4/1965 | Sutton | 318/257 X |
| 3,183,372 | 5/1965 | Chin | 318/257 UX |

FOREIGN PATENTS OR APPLICATIONS
400,315   4/1966   Switzerland........................ 321/47

Primary Examiner—A. D. Pellinen
Attorney, Agent, or Firm—Misegades, Douglas & Levy

[57] ABSTRACT

A switching circuit for energising a load with unidirectional current of either polarity as desired from an a.c. supply includes a pair of triacs connected as a full wave rectifier in which the control electrodes of the triacs are responsive to control currents which are derived from the a.c. supply by a control switch which switches diodes into the control current path so that the control current flows in a direction such that the triac conducts to establish the required current in the load.

5 Claims, 1 Drawing Figure

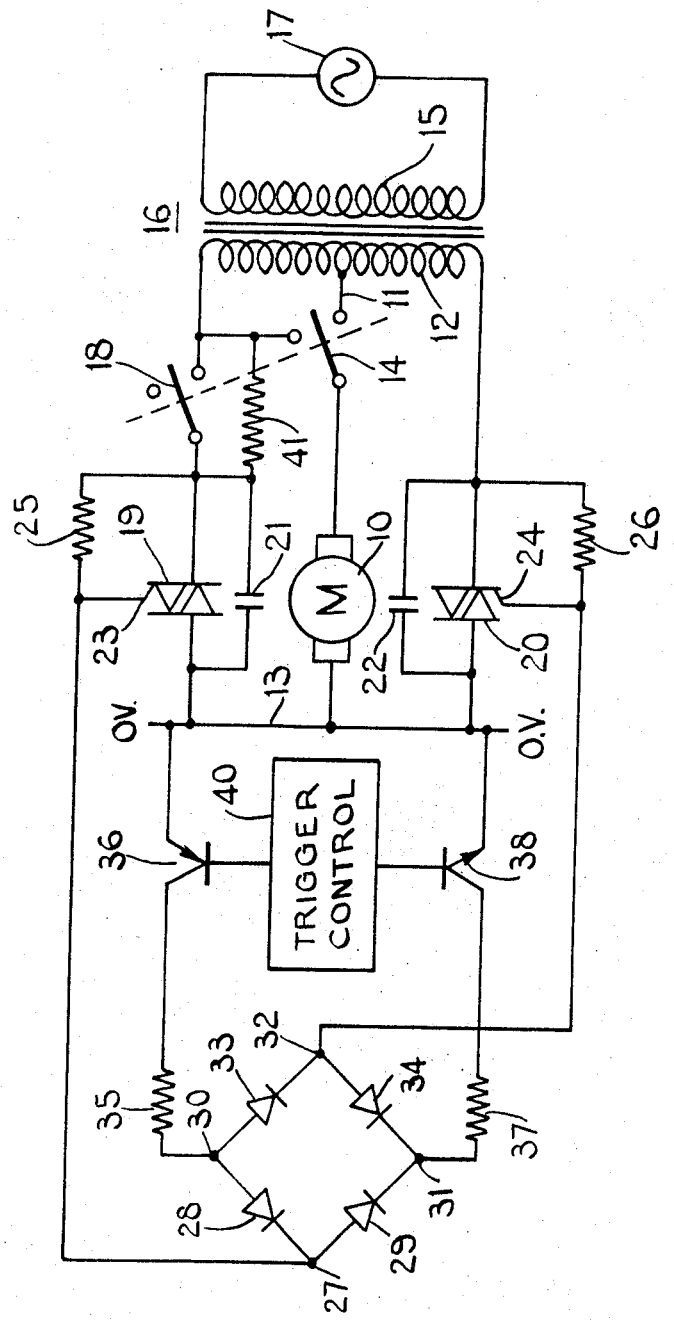

SWITCHING CIRCUITS FOR ENERGISING A LOAD

BACKGROUND OF THE INVENTION

The invention relates to switching circuits for energising a load with either polarity of current.

One way of achieving either polarity of load drive current is to appropriately control rectification of an a.c. supply. Rather than have separate rectifier circuits for each polarity it is clearly advantageous to use controlled switching devices capable of conduction in either direction, for example triacs, and to combine both rectifying actions in the one circuit depending on the times at which the switching devices are operated relative to the half-cycles of a.c. supply. Problems arise in achieving correct phasing of such switching action relative to the a.c. supply to ensure selection of the desired polarity of rectified current. Other problems can also arise over timing the switching action to ensure that the motor back emf is overcome by the instantaneous value of the rectified output.

SUMMARY OF THE INVENTION

According to the invention a switching circuit for energising a load with unidirectional current from an a.c. supply including a path for the flow of a control current from the a.c. supply; control switching means operable to cause first and second impedance conditions in said path to produce first and second control currents respectively according to the polarity desired for energisation of the load; and rectifying means for receiving the a.c. supply and operative in response to the first control current to establish unidirectional current of first polarity through the load and in response to the second control current to establish unidirectional current of second polarity opposite to the first polarity through the load.

Using embodiments of the invention, the establishment of current flow through the load, for example by firing one of two triacs which at any one time will give opposite polarities, is done only as a result of sensing current flows for the chosen impedance conditions. This eliminates the phasing problems mentioned above which, in the triac arrangement, results from the given polarities alternating for each triac from half-cycle to half-cycle of the a.c. supply.

Suitable switching means, such as transistors associated with diodes, alternatively present open circuit and unidirectional flow impedance conditions for each output current polarity and serve to allow only one direction of current flow at a time in control current paths from the a.c. supply. Such current flow is used to operate other means, preferably triacs, for establishing the desired polarity of current in the load circuit according to the control current polarity.

The use of a transformer with a centre tapped secondary is preferred for feeding a tape drive motor, with triacs in a full-wave rectifier configuration under the control of corresponding control circuit paths including transistor switches and current direction selection diodes.

It is equally feasible to use a transformer with an untapped secondary and a half-wave rectifier configuration for the motor or other load. Both modes may be provided for by a suitable switch, thereby providing a choice of drive speeds.

The switching means may be triggered for each half cycle in accordance with the load voltage regulation, but need not be.

DESCRIPTION OF THE DRAWING

One embodiment of the invention will now be described in detail, by way of example, with reference to the drawing which shows a circuit diagram of a two-speed, bidirectional motor energisation system for a magnetic tape transport.

DESCRIPTION OF THE PREFERRED EMBODIMENT

A motor 10 is connected between the centre-tap 11 of a transformer secondary winding 12 and a zero voltage rail 13 when a suitable switch 14, such as a relay contact, is on the lower of its shown positions. The primary winding 15 of the transformer 16 is connected to an a.c. supply 17 and ganged with the first switch 14 to open or close one path from the upper end of the transformer secondary 12. With the switch 18 also in the lower of its shown positions the configuration relative to triacs 19 and 20 then both connected between opposite ends of the secondary winding 12 and the ground rail 13 is that of a full-wave rectifier for which the output current direction can be controlled by appropriate switching of the triacs 19 and 20. The triacs 19 and 20 are normally 'off' and have capacitors 21, 22, respectively connected across them.

The control electrodes 23, 24 of the triacs 19, 20, respectively, are connected to the transformer sides of the triacs via resistors 25 and 26 respectively, which serve to reduce the triac noise sensitivity. The control electrode 23 of the upper triac 19 is also connected to a point 27 between a pair of diodes 28, 29 connected in series between circuit points 30 and 31. The control electrode 24 of the other triac 20 is similarly connected to a point 32 between another pair of diodes 33, 34 connected in series aiding between the points 30 and 31. The four diodes 28, 29, 33, and 34 are poled as though for forward current flow from point 30 to point 31.

The point 30 is connected by a resistor 35 and the emitter-collector path of a switching transistor 36 for current flow from the zero volts rail 13 when the transistor 36 is 'on'. The point 31 is similarly connected via a resistor 37 and the emitter-collector path of another switching transistor 38 for current flow towards the zero volts rail 13. Trigger pulses are provided by a suitable network 40 which may be as described in our copending application Ser. No. 301,780. In my copending application Ser. No. 301,780 which has been assigned to the Assignees of the present application I have disclosed a pulse generating network which provides signals suitable for use with the load energisation circuit of the present invention. The network of my copending Application produces pulses from a rectified a.c. signal by using a switch means to sample the rectified a.c. signal. The switch means passes a portion of each half cycle of the a.c. signal to an arranging circuit which produces an arranged signal which is compared with a ramp signal to obtain an output pulse whenever the ramp signal exceeds the output of said averaging circuit. A feed back arrangement responsive to the output pulses controls the operation of the sampling means. These output pulses are suitable for controlling the operation of the switches 36 and 38 according to which direction of motor drive is required. In view of the disclosure of the above mentioned copending application the actual structural details of the network 40 are of little significance to the present description so long as the network will provide signals such as the pulses produced by the circuit of the copending application for controlling conductor of one or the other of the transistors 36 and 38 according to which direction of motor drive is required. In other words, the pulses produced by the unit 40 are directed to one or the other of the transducers 36 or 38 as required which latter act as direction determining switches. Also, of course, other types of switch may replace the transistors 36 and 38.

The way in which the direction of the motor drive depends on the conduction state of the switches 36 and 38 will now be described. The motor drive direction will depend on the direction of current flow through the motor 10. As the rail 13 is held at zero volts this direction of current flow clearly depends on the relative voltage polarity of the center tap 11 of transformer secondary 12.

When the switch 36 is closed there are two possible paths for current flow from the zero rail 13 through resistor 35. One path is via the diode 28, resistor 25 and switch 18 to the upper end of the transformer secondary 12. The other path is via the diode 33 and resistor 26, to the lower end of the transformer secondary 12. As seen from the transformer secondary there are two pairs of parallel paths from ground, one of said pairs of parallel paths includes the diode 28 and the triac 19 and the other of said pairs of parallel paths includes the diode 33 and the triac 20. Whether current flows in either of the diode paths depends on the voltage polarity at the appropriate end of the transformer secondary 12. For current flow this polarity must be negative. So, to get current flow in the path including the diode 28, the switching transistor 36 must be triggered 'on' during those half cycles of the a.c. supply 17 when the upper end of the transformer secondary is negative. Triggering the switching transistor 36 'on' during the other half cycles will cause similar current flow through the other path including diode 33, as the lower end of the transformer secondary will be negative. When such current flow takes place through either of the diodes 28 and 33 the conditions at the corresponding one of the triac control electrodes 23 and 24 respectively will switch the triac, 19 and 20, on to increase the same direction of current flow as in the corresponding diode. This action will force the centre tap 11 to a positive potential relative to the motor 10 in every half-cycle thereby achieving one drive direction.

A similar consideration of the effect of closing the switch 38 reveals that current may flow from the ends of the transformer secondary 12 to the zero volts rail 13 via paths including the diodes 29 or 34 in alternate cycles of the a.c. supply. Such action can cause current flow into the control electrodes of the triacs 19 and 20 in successive cycles, corresponding to current flow through diodes 29 and 34 respectively, to switch the triacs on to increase the same direction of current as for the associated diode. This current direction is opposite to that for closure of the switch 36 and results in the centre tap 11 of the transformer secondary 12 being made negative relative to the motor in every half cycle to achieve the opposite drive direction.

At the end of each half-cycle during which a triac is switched on, the triac concerned will cease to conduct. Even if the direction-determining switch (one of 36 and 38) is maintained switched on the other triac will not switch on until the transformer voltage builds up to a level depending on the characteristics of triac itself and of the resistors in the path feeding the triac gate or control electrode, and until the transformer voltage exceeds the motor back emf. The full-wave rectifier type operation with motor drive in successive half-cycles can therefore be achieved either by keeping the appropriate triac on continuously or by using trigger pulses at twice the a.c. frequency and each overlapping the time in each half-cycle at which the transformer voltage reaches a level at which a triac will be triggered by its gate current. Trigger pulses at half this rate will produce a half-wave rectifier type action with only one triac being operated.

The effect of operating only one of the switches 36 and 38 at a time is to present different impedance conditions, namely open circuit or one of resistors 35 and 37 depending on which switch closes, to prevent or permit a predetermined direction of current flow in the paths from which the triac gates are tapped, such paths thus constituting control paths. The triacs can thus be switched only by control path current that corresponds with the desired direction of motor drive as determined by which of the switches 36 and 38 closed.

The switches 14 and 18 are ganged and, as mentioned above, preferably comprise relay contacts. The operation of the switches 14 and 18 is independent of the operation of the trigger control 40 and the operation of the switches 36 and 38. The essential function of the switches 14 and 18 is that of enabling a high and low speed facility. Consequently their position determines motor speed. In the above description the lower of the shown alternative positions has been assumed and been shown to permit full-wave rectifier type operation with motor drive applied in every half-cycle. If the switches are moved to their upper positions the motor 10 will be connected across the whole of the transformer secondary 12 and higher motor speeds will result though only half-wave type operation will occur. A relatively large resistor 41 is connected across the switch 18 to prevent unwanted switching on of the triac 19 by transients resulting from switching from high speed to normal speed modes. The switches 14, 18 can thus be operated at any time without having to wait for both triacs to be off and/or the motor to be at rest.

The circuit described and illustrated does not require that the trigger control circuit be sensitive to the phase of the a.c. supply. Also, it is impossible for the motor to drive in the wrong direction. Furthermore, the fact that the triacs are arranged not to fire until the transformer voltage exceeds the maximum possible value for motor back emf means that it is possible to achieve more effective utilisation of the motor rating.

The switching transistors 36 and 38 need to have a breakdown voltage at least equal to the motor back emf plus the peak transformer voltage. However, the dissipation in these switching transistors once each triac is switched on will be small as, then, only the triac 'on' voltage appears across them.

With appropriate trigger pulse gating, embodiments of the invention can be devised to work from a three-phase transformer.

I claim:

1. A circuit for energising a load with unidirectional current from an a.c. supply including; terminals for connection with the load, a first normally non conductive load energising current path for the flow of current between the supply and the terminals; a first control current path for the flow of control current between the supply and the terminals; a first control rectifier means for restricting current flow in the first control path to a first direction; a first switchable rectifier means in the first energising current path and having a control electrode connected to the first control path to be responsive to the first control current for enabling current flow in the first energising current path; and a control switch means for controlling flow of current in the first control path.

2. A control circuit as claimed in claim 1 and including a transformer secondary winding from which the a.c. supply is derived, the secondary winding having a centre tap connected to one of the terminals; and first and second winding ends; said first control current path and the first energising current path being connected between the first winding end and the other of said terminals.

3. A control circuit as claimed in claim 2, and including a second normally non-conductive load energising path for the flow of control current betwen the other of said terminals and the second end of said secondary winding; a second switchable rectifier means for enabling current flow in said first direction; a second control current path connecting the second end of said winding to the first control current path at a circuit point between said first control rectifier means and said other terminal; a second controll rectifier means in the second control current path poled in the same sense as the first control rectifier means; and a control electrode to the second switchable rectifier means connected to the second control path to be responsive to current in the second control current path; said control switch means being connected to control current flow in both said paths.

4. A control circuit as claimed in claim 2, and further including a second normally non-conductive load energising path for the flow of current between the other of said terminals and a second end of the secondary winding; a second control current path for the flow of control current between the other of said terminals and said second end; a second control rectifier means for restricting current flow in the second control current path to said first direction; a second switchable rectifier means responsive to current flow in the second control current path for enabling current flow in said first direction in the second energising current path and second control switch means for controlling flow of current in the second control current path.

5. A control circuit as claimed in claim 4, in which both of said first and second switchable rectifiers are operationally bidirectional and including; a first current sub-path from the first to the second control path a third control rectifier in said first sub-path poled in the same sense as the first control rectifier in the first control path, said first sub-path enabling current flow from the first control path to the second switchable rectifier means and said second winding end; a second current sub-path from the second to the first control path; a fourth control rectifier in said second sub-path poled in the same sense as the second control rectifier in the second control path, said second sub-path enabling current flow from the second control path to the first switchable rectifier means and said first winding end.

* * * * *